US010776809B1

(12) United States Patent
Aaron et al.

(10) Patent No.: US 10,776,809 B1
(45) Date of Patent: Sep. 15, 2020

(54) USE OF PAYMENT CARD REWARDS POINTS FOR AN ELECTRONIC CASH TRANSFER

(71) Applicant: Square, Inc., San Francisco, CA (US)

(72) Inventors: Paul Aaron, San Francisco, CA (US); Keisuke Omi, Brooklyn, NY (US); Matthew Dolan, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 945 days.

(21) Appl. No.: 14/506,541

(22) Filed: Oct. 3, 2014

Related U.S. Application Data

(60) Provisional application No. 62/049,298, filed on Sep. 11, 2014.

(51) Int. Cl.
*G06Q 20/22* (2012.01)
*G06Q 30/02* (2012.01)

(52) U.S. Cl.
CPC ......... *G06Q 30/0233* (2013.01); *G06Q 20/22* (2013.01)

(58) Field of Classification Search
None
See application file for complete search history.

(56) References Cited

U.S. PATENT DOCUMENTS

| | | | |
|---|---|---|---|
| 5,787,402 A | 7/1998 | Potter et al. | |
| 6,330,550 B1 | 12/2001 | Brisebois et al. | |
| 7,269,251 B1 | 9/2007 | Jokinen | |

(Continued)

FOREIGN PATENT DOCUMENTS

| | | |
|---|---|---|
| JP | 2003-256522 A | 9/2003 |
| KR | 10-2000-0072676 A | 12/2000 |
| WO | 2015/179681 A1 | 11/2015 |

OTHER PUBLICATIONS

Journal of Robotics & machine learning Itemize Llc; "Itemized Receipt Extraction Using Machine Learning" in Patent Application Approval Process http://dialog.proquest.com/professional/docview/1267645443?accountid=131444 (Year: 2013).*

(Continued)

*Primary Examiner* — Anita Coupe
*Assistant Examiner* — Darnell A Pouncil
(74) *Attorney, Agent, or Firm* — Baker Botts L.L.P.

(57) ABSTRACT

A computer-implemented technique for applying rewards points associated with a payment card is disclosed. A computer system stores information associated with a person's payment card, such as a credit or debit card, including information indicative of rewards points associated with the card. The computer system then receives from a remote device a first message indicative of a transaction between the person and another entity. The transaction includes a payment of a specified amount from the person to the other entity. In some embodiments the transaction has already been completed, and the computer system causes rewards points to be applied to it post-transaction. In other embodiments the transaction has not yet been executed and may be a requested cash transfer. The computer system determines how many rewards points correspond to the specified amount and causes the rewards points to be used for at least a portion of the transaction amount.

22 Claims, 8 Drawing Sheets

(56) References Cited

U.S. PATENT DOCUMENTS

| | | | |
|---|---|---|---|
| 7,606,734 | B2 | 10/2009 | Baig et al. |
| 7,716,129 | B1 | 5/2010 | Tan et al. |
| 7,725,375 | B2 | 5/2010 | Shepherd |
| 7,814,017 | B2 | 10/2010 | Vancini et al. |
| 8,010,993 | B1 | 8/2011 | Bartholomay et al. |
| 8,140,418 | B1 | 3/2012 | Casey et al. |
| 8,380,591 | B1 | 2/2013 | Kazenas et al. |
| 8,447,666 | B1 | 5/2013 | Keld |
| 8,539,568 | B1 | 9/2013 | Milas |
| 8,571,975 | B1 | 10/2013 | Lehman et al. |
| 8,606,703 | B1 | 12/2013 | Dorsey et al. |
| 8,639,621 | B1 | 1/2014 | Ellis et al. |
| 8,688,540 | B1 | 4/2014 | Patel et al. |
| 9,402,000 | B2 | 7/2016 | Raj et al. |
| 9,875,469 | B1 | 1/2018 | Chin et al. |
| 9,922,324 | B2 | 3/2018 | Wilson et al. |
| 10,102,518 | B2 | 10/2018 | Arthur et al. |
| 2001/0054003 | A1 | 12/2001 | Chien et al. |
| 2002/0029342 | A1 | 3/2002 | Keech |
| 2002/0111907 | A1 | 8/2002 | Ling |
| 2002/0147658 | A1 | 10/2002 | Kwan |
| 2003/0217005 | A1 | 11/2003 | Drummond et al. |
| 2004/0267660 | A1 | 12/2004 | Greenwood et al. |
| 2005/0021400 | A1 | 1/2005 | Postrel |
| 2005/0021401 | A1* | 1/2005 | Postrel ............ G06Q 30/02 705/14.3 |
| 2005/0050145 | A1 | 3/2005 | Lowe |
| 2005/0192893 | A1 | 9/2005 | Keeling et al. |
| 2005/0273405 | A1 | 12/2005 | Chen |
| 2006/0006226 | A1 | 1/2006 | Fitzgerald et al. |
| 2006/0208066 | A1 | 9/2006 | Finn et al. |
| 2007/0119918 | A1 | 5/2007 | Hogg et al. |
| 2007/0192191 | A1 | 8/2007 | Neal et al. |
| 2007/0198360 | A1 | 8/2007 | Rogers et al. |
| 2007/0271342 | A1 | 11/2007 | Brandt et al. |
| 2008/0059375 | A1 | 3/2008 | Abifaker |
| 2008/0103968 | A1* | 5/2008 | Bies ............ G06Q 20/06 705/39 |
| 2008/0189186 | A1 | 8/2008 | Choi et al. |
| 2008/0276308 | A1 | 11/2008 | Graser et al. |
| 2009/0171794 | A1* | 7/2009 | Hogan ............ G06Q 20/04 705/17 |
| 2009/0228966 | A1 | 9/2009 | Parfene et al. |
| 2009/0270077 | A1 | 10/2009 | Fiorini et al. |
| 2010/0017334 | A1 | 1/2010 | Itoi et al. |
| 2010/0121764 | A1 | 5/2010 | Niedermeyer |
| 2010/0131409 | A1 | 5/2010 | Lawyer et al. |
| 2010/0186066 | A1 | 7/2010 | Pollard |
| 2010/0198728 | A1 | 8/2010 | Aabye et al. |
| 2010/0280896 | A1 | 11/2010 | Postrel |
| 2011/0022472 | A1 | 1/2011 | Zon |
| 2011/0035287 | A1 | 2/2011 | Fox |
| 2011/0047045 | A1 | 2/2011 | Brody et al. |
| 2011/0082767 | A1 | 4/2011 | Ryu et al. |
| 2011/0113068 | A1 | 5/2011 | Ouyang et al. |
| 2011/0119155 | A1 | 5/2011 | Hammad et al. |
| 2011/0219230 | A1 | 9/2011 | Oberheide et al. |
| 2011/0238539 | A1 | 9/2011 | Phillips et al. |
| 2011/0287726 | A1 | 11/2011 | Huang |
| 2011/0307388 | A1 | 12/2011 | Kim et al. |
| 2012/0036042 | A1 | 2/2012 | Graylin et al. |
| 2012/0101896 | A1 | 4/2012 | Veeneman et al. |
| 2012/0130785 | A1 | 5/2012 | Postrel |
| 2012/0130898 | A1 | 5/2012 | Snyder et al. |
| 2012/0131121 | A1 | 5/2012 | Snyder et al. |
| 2012/0143722 | A1 | 6/2012 | John |
| 2012/0166334 | A1 | 6/2012 | Kimberg et al. |
| 2012/0226588 | A1 | 9/2012 | Wuhrer et al. |
| 2012/0295580 | A1 | 11/2012 | Corner |
| 2012/0310752 | A1 | 12/2012 | Gaddis |
| 2012/0323717 | A1 | 12/2012 | Kirsch |
| 2013/0041821 | A1 | 2/2013 | Kingston et al. |
| 2013/0046707 | A1 | 2/2013 | Maskatia et al. |
| 2013/0054395 | A1 | 2/2013 | Cyr et al. |
| 2013/0080415 | A1 | 3/2013 | Maskatia et al. |
| 2013/0085804 | A1 | 4/2013 | Leff et al. |
| 2013/0132182 | A1 | 5/2013 | Fung et al. |
| 2013/0138535 | A1 | 5/2013 | Hsiao |
| 2013/0159173 | A1 | 6/2013 | Sivaraman et al. |
| 2013/0291099 | A1 | 10/2013 | Donfried et al. |
| 2013/0297425 | A1 | 11/2013 | Wallaja |
| 2013/0305367 | A1 | 11/2013 | Yoshioka et al. |
| 2014/0019290 | A1 | 1/2014 | Beaver |
| 2014/0019352 | A1 | 1/2014 | Shrivastava |
| 2014/0108235 | A1 | 4/2014 | Chelst et al. |
| 2014/0108263 | A1 | 4/2014 | Ortiz et al. |
| 2014/0164254 | A1 | 6/2014 | Dimmick |
| 2014/0180826 | A1 | 6/2014 | Boal |
| 2014/0201067 | A1 | 7/2014 | Lai et al. |
| 2014/0214658 | A1 | 7/2014 | Hammad et al. |
| 2014/0230039 | A1 | 8/2014 | Prakash et al. |
| 2014/0236838 | A1 | 8/2014 | Asar et al. |
| 2014/0310090 | A1* | 10/2014 | Postrel ............ G06Q 30/02 705/14.33 |
| 2014/0351118 | A1 | 11/2014 | Zhao |
| 2014/0351126 | A1 | 11/2014 | Priebatsch |
| 2015/0006529 | A1 | 1/2015 | Kneen et al. |
| 2015/0052062 | A1 | 2/2015 | Flomin et al. |
| 2015/0095990 | A1 | 4/2015 | Ranganathan et al. |
| 2015/0100482 | A1 | 4/2015 | Zamer et al. |
| 2015/0134518 | A1 | 5/2015 | Turovsky et al. |
| 2015/0281238 | A1 | 10/2015 | Ramachandran et al. |
| 2015/0304250 | A1 | 10/2015 | Zomet et al. |
| 2015/0332230 | A1 | 11/2015 | Gaines et al. |
| 2015/0339656 | A1 | 11/2015 | Wilson et al. |
| 2015/0339668 | A1 | 11/2015 | Wilson et al. |
| 2016/0042328 | A1 | 2/2016 | Teckchandani et al. |

OTHER PUBLICATIONS

"A Traveler's Review of the Capital One Venture Rewards Card," Published on Jul. 11, 2013, Retrieved from the Internet URL: http://web.archive.org/web/20130923122057/http://queenofsubtle.com/rt/travel-tips/a-travelers-review-of-the-capital-one-venture-rewards-card, on Apr. 1, 2015, pp. 1-3.

Bruene, J., "Capital One Add Rewards to Mobile App, Includes Ability to Redeem for Previous Travel," netbanker.com, Published on Apr. 20, 2012, Retrieved from the Internet URL: http://www.netbanker.com/2012/04/capital_one_add_rewards_to_mobile_app_includes_ability_to_redeem_for_previous_travel.html, on Apr. 1, 2015, pp. 1-2.

Non-Final Office Action dated Mar. 3, 2015 for U.S. Appl. No. 14/506,534, of Aaron, P. et al. filed Oct. 3, 2014.

U.S. Appl. No. 14/506,534 of Aaron, P. et al., filed Oct. 3, 2014.

Final Office Action dated Jun. 24, 2015, for U.S. Appl. No. 14/506,534, of Aaron, P., et al., filed Oct. 3, 2014.

"Going Dutch," Wikipedia, Retrieved from the Internet URL: https://en.wikipedia.org/w/index.php?title=Going%20Dutch&%20oldi%20d=45401476, on Mar. 25, 2016, pp. 1-2.

Apple Inc., "In App Purchase Programming Guide," published Jun. 17, 2011, Retrieved from the Internet URL: https://www.rapid-ideas.com/previews/wsa/page9/files/StoreKitGuide.pdf, pp. 1-38.

Non-Final Office Action dated Dec. 16, 2014, U.S. Appl. No. 14/283,504, of Wilson, J., et al., filed May 21, 2014.

Final Office Action dated Apr. 21, 2015, U.S. Appl. No. 14/283,504, of Wilson, J., et al., filed May 21, 2014.

Non-Final Office Action dated Dec. 1, 2015, U.S. Appl. No. 14/283,504, of Wilson, J., et al., filed May 21, 2014.

Final Office Action dated Mar. 23, 2016, U.S. Appl. No. 14/283,504, of Wilson, J., et al., filed May 21, 2014.

Non-Final Office Action dated Apr. 6, 2016, U.S. Appl. No. 14/284,224, of Wilson, J., et al., filed May 21, 2014.

Non-Final Office Action dated Oct. 4, 2016, for U.S. Appl. No. 14/283,504, of Wilson, J., et al., filed May 21, 2014.

Final Office Action dated Oct. 6, 2016, for U.S. Appl. No. 14/284,224, of Wilson, J., et al., filed May 21, 2014.

Non-Final Office Action dated Dec. 5, 2016, for U.S. Appl. No. 14/283,617, of Wilson, J., et al., filed May 21, 2014.

(56) References Cited

OTHER PUBLICATIONS

Advisory Action dated Dec. 27, 2016, for U.S. Appl. No. 14/284,224, of Wilson, J., et al., filed May 21, 2014.
Non-Final Office Action dated Apr. 7, 2017, for U.S. Appl. No. 14/284,224, of Wilson, J., et al., filed May 21, 2014.
Final Office Action dated May 30, 2017, for U.S. Appl. No. 14/283,504, of Wilson, J., et al., filed May 21, 2014.
Non-Final Office Action dated Jun. 16, 2017, for U.S. Appl. No. 14/664,775, of Omojola, A., filed Mar. 20, 2015.
Final Office Action dated Jul. 12, 2017, for U.S. Appl. No. 14/283,617, of Wilson, J., et al., filed May 21, 2014.
Notice of Allowance dated Nov. 30, 2017, for U.S. Appl. No. 14/284,224, of Wilson, J., et al., filed May 21, 2014.
Final Office Action dated Dec. 15, 2017, for U.S. Appl. No. 14/664,775, of Omojola, A., filed Mar. 20, 2015.
Advisory Action dated Jan. 29, 2018, for U.S. Appl. No. 14/664,775, of Omojola, A., filed Mar. 20, 2015.
Non-Final Office Action dated Mar. 8, 2018, for U.S. Appl. No. 14/283,617, of Wilson, J., et al., filed May 21, 2014.
Final Office Action dated Jan. 18, 2019, for U.S. Appl. No. 14/283,617, of Wilson J. et al., filed May 21, 2014.
Non-Final Office Action dated Feb. 11, 2019, for U.S. Appl. No. 14/664,775, of Omojola, A. et al. filed Mar. 20, 2015.
International Search Report and Written Opinion for International Application No. PCT/US2015/032030, dated Aug. 31, 2015.
Non-Final Office Action dated Jun. 19, 2019, for U.S. Appl. No. 14/283,617, of Wilson, J., et al., filed May 21, 2014.
Final Office Action dated Aug. 12, 2019, for U.S. Appl. No. 14/664,775, of Omojola, A., filed Mar. 20, 2015.
Final Office Action dated Nov. 5, 2019, for U.S. Appl. No. 14/283,617, of Wilson, J., et al., filed May 21, 2014.

* cited by examiner

USE OF PAYMENT CARD REWARDS POINTS FOR AN ELECTRONIC CASH TRANSFER

This application claims the benefit of U.S. provisional patent application No. 62/049,298, filed on Sep. 11, 2014, which is incorporated by reference herein in its entirety.

FIELD OF THE INVENTION

The present invention pertains to machine-implemented techniques for facilitating and making payments, and more particularly, to a technique for applying rewards points associated with a payment card to a payment transaction.

BACKGROUND

Many credit cards have rewards programs that are designed as incentives for cardholders to use their cards more frequently and for large purchases. A cardholder (consumer) typically earns rewards points on his or her credit card by making purchases with the credit card and can redeem rewards points for merchandise or services, or can use them to offset the card's unpaid balance.

One way of redeeming rewards points for good or services is for the cardholder to request a merchant to apply rewards points from his or her credit card to a transaction (e.g., a purchase) at the time of checkout for the transaction, such as when the cardholder provides his or her credit card information to the merchant. That approach is not optimal, however, because consumers often forget about their rewards points when making purchases and therefore neglect to use their points. Further, when making a purchase, a consumer may not know his or her rewards points balance or may be unsure of whether the balance is sufficient to cover the purchase price (rewards points often do not have a one-to-one relationship with the local currency). Likewise, a consumer may be unsure of whether their rewards points can be redeemed for the type of goods or services being purchased.

As a result, consumers tend to accumulate rewards points on their credit cards but redeem them infrequently. Consequently, credit card rewards programs may not be as effective as they were intended to be, at encouraging consumers to use their credit cards.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
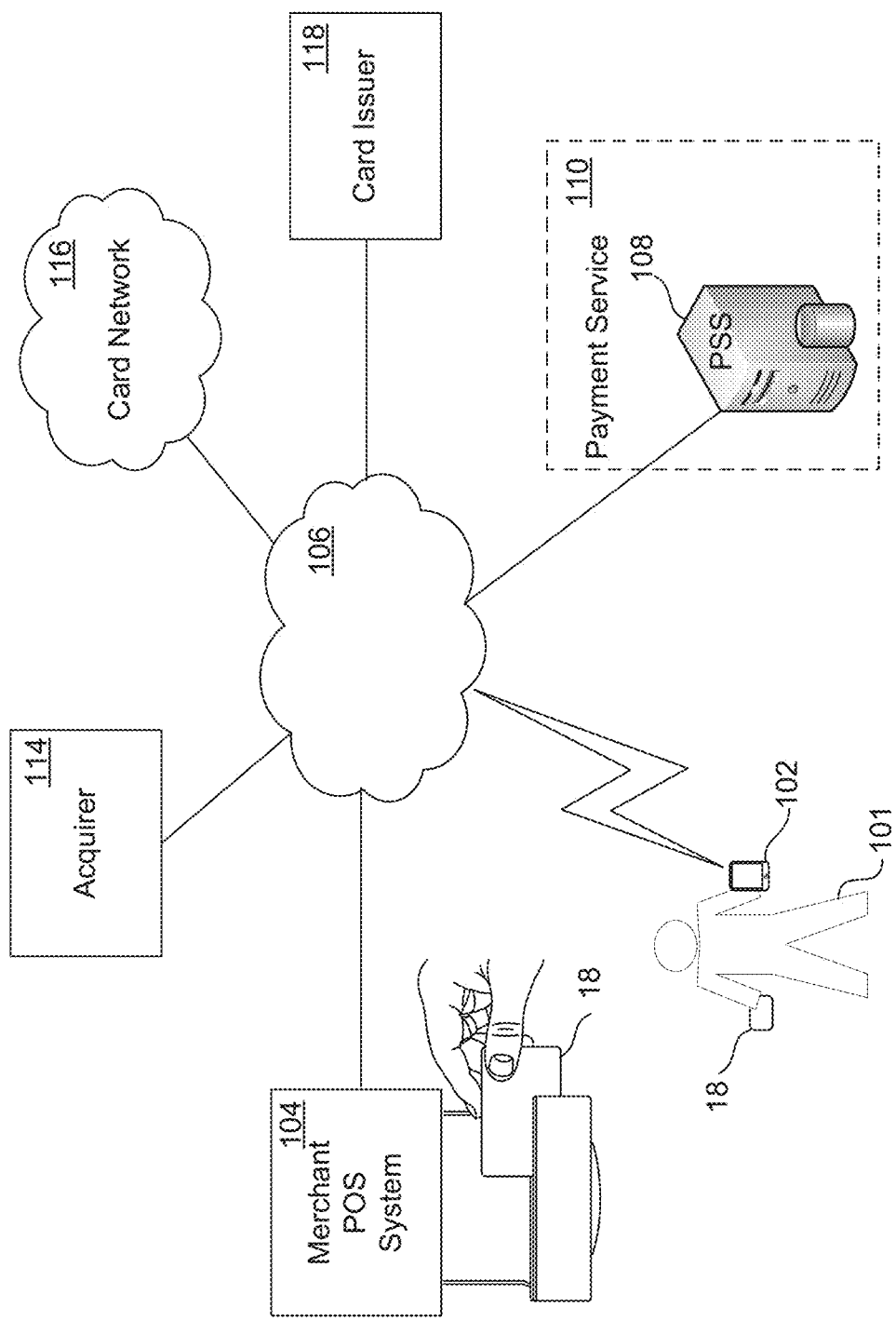
FIG. 1 illustrates an environment in which the rewards points technique introduced here can be implemented.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a computer-implemented technique that makes it easier for consumers to use rewards points earned by their payment cards. In the technique, a centralized server computer system that includes one or more computers, collectively called the payment service system (PSS), stores information associated with a person's payment card (or multiple payment cards), such as a credit and/or debit card, including information indicative of rewards points associated with the card. At some point in time the PSS receives from a remote device a message indicative of a completed credit card based transaction between the person and another entity (e.g., another person or a business). The transaction includes a payment of a specified amount (transaction amount) from the person to the other entity. The PSS determines how many rewards points of the card used in the transaction correspond to the transaction amount and, if the cardholder so requests, causes the rewards points to be used to satisfy at least a portion of the transaction amount. The PSS may do this in response to an express request from the person (the cardholder) in relation to that specific transaction, or it may do it automatically (e.g., according to a previously-specified user preference or a default setting or policy).

Notably, the technique can be applied to a particular transaction in a post-transaction manner (i.e., after the transaction is complete between the merchant and the consumer), thereby avoiding at least some of the disadvantages of the conventional points redemption method described above. For example, in some embodiments the transaction has already been completed when the PSS receives a transaction message indicative of the transaction. In such embodiments the transaction message may originate from a merchant's point-of-sale (POS) terminal or the issuing bank of a consumer's card and may be an indication of a completed purchase by the consumer using the consumer's credit card. In such cases the PSS may send an interactive digital receipt to a user device of the consumer (e.g., a smartphone, tablet computer, notebook computer, desktop computer, or the like). Alternatively, the PSS may send the user device a message that enables the consumer to access and retrieve the interactive digital receipt.

The interactive digital receipt, when displayed by the consumers' user device, includes the transaction amount (e.g., purchase price), the number of points that correspond to the transaction amount, and a prompt for the consumer to provide an input indicating his or her request to apply the rewards points to the transaction. In response to such input by the consumer, the user device sends a message to the PSS, which applies the rewards points to the transaction, or to a portion of the transaction amount specified by the consumer.

The PSS may do this by, for example, causing some or all of the transaction amount to be voided from the transaction (assuming the transaction has not yet been funded by the card-issuing bank) or by causing reversal of payment of some or all of the transaction amount (assuming the transaction has already been funded by the issuing bank). The PSS can communicate with the issuing bank directly or through a third party, for purposes of applying the rewards points to the transaction.

The interactive digital receipt may include a list of items involved in the purchase (i.e., a "shopping basket" list) and the corresponding number of rewards points for each item (tax may also be factored in). Consequently, the consumer can request, via the interactive digital receipt, the PSS to apply rewards points to only a specified portion of the purchase price, e.g., to a portion corresponding to only one or more specified items in the purchase.

In some embodiments, the PSS may automatically apply rewards points to some or all of the transaction amount, i.e., without waiting for a request to do so from the consumer for that transaction.

Further, in some embodiments, the PSS tracks multiple types of rewards points associated with the consumer's credit card and enables the consumer to apply rewards points from any one or more of those multiple categories, or even from multiple different cards, to a particular transaction.

In some embodiments, the technique introduced here also enables a person to use credit card rewards points for at least a portion of a cash transfer from his or her bank account to the bank account of another person or entity. For example, in some embodiments the PSS stores not only information about a person's credit card, including rewards points information, but also information about a bank account and associated debit card of the person. In such embodiments, the initial message received by the PSS is an electronic message from the person's device representing a request to make a cash payment of a specified amount to another person or other entity (e.g., a business). The PSS then determines how many rewards points correspond to the specified payment amount. Optionally, before applying the rewards points to the payment (cash transfer), the PSS may send a message to the payer's device, informing him or her of the exact number of rewards points corresponding to the specified transfer amount, and asking the person to indicate whether he or she wants rewards points to be used for the cash transfer (and, optionally, how many points should be used). If the person so indicates by an input to his or her user device, the user device sends a message to the PSS, in response to which the PSS causes at least a portion of the cash transfer amount to be satisfied from the payer's rewards points. This action can include causing at least some of the cash transfer amount to be satisfied from the payer's credit card rewards points and deposited to an account of the payee (e.g., by using debit card information of the payee's bank account), and causing any remainder of the cash transfer amount to be debited from the payer's bank account (e.g., by using the payer's debit card information) and deposited to an account of the payee.

FIG. 1 illustrates an environment in which the rewards points technique introduced here can be implemented. The environment includes a merchant's POS system 104 and a mobile device 102 of a consumer 101 (also called "customer" or "user"). The mobile device 102 can be, for example, a smartphone, tablet computer, notebook computer, or any other form of mobile processing device. Alternatively, in some embodiments the mobile device 102 can be replaced with a non-mobile user device, such as a standard desktop computer.

The illustrated environment also includes a computer system 114 of the merchant's acquiring bank ("acquirer") for credit card transactions, a computer system 118 of the issuing bank ("issuer") of the user's payment card 18, a computer system 116 of a card payment network (e.g., Visa or MasterCard), and a computer system 108 of a payment service. The payment card 18 can be a conventional credit card, for example. Alternatively, the payment card 18 can be a debit card, automatic teller machine (ATM) card, or the like. Each of the aforementioned computer systems can include one or more distinct physical computers and/or other processing devices which, in the case of multiple devices, can be connected to each other through one or more wired and/or wireless networks.

All of the aforementioned devices are coupled to each other through an internetwork 106, which can be or include the Internet and one or more wireless networks (e.g., a cellular telecommunications network and/or WiFi network).

The PSS 108 in at least some embodiments includes one or more server computers programmed to provide payment related services to consumers, including at least some aspects of the rewards points technique introduced here. The PSS 108 can be operated by a payment service 110, which can be a business enterprise that provides and facilitates various types of payment related services for consumers. Consumers can register with the payment service 110 to receive such services, and such consumers are referred to herein as "registered users." One type of service provided by the payment service 110 is enabling registered users to apply rewards points associated with their payment cards to already-completed transactions, as described further below.

The PSS 108 stores information about registered users provided voluntarily by them, such as their names, addresses, credit card numbers, debit card numbers, bank account numbers, mobile telephone numbers, email addresses, etc. Further, the PSS 108 stores rewards points information associated with registered users' payment cards. The PSS 108 may obtain current rewards points balances of registered users from the corresponding card issuers (e.g., issuer 118) directly or through a third party. For example, the PSS 108 may use a published application programming interface (API) of a card issuer to obtain current rewards points balances for credit cards of registered users.

The PSS 108 also stores information about devices used by its registered users, particularly mobile devices (e.g., smartphones and tablet computers), but also potentially including users' conventional devices such as desktop computers. Hence, the PSS 108 can communicate with a user's device 102 over internetwork 106.

The rewards points technique introduced here can be applied with both traditional card-present transactions (i.e., transactions involving reading a customer payment card present at the merchant's POS) as well as "cardless" payment card transactions, the latter of which are described further below. In a traditional card-present payment card transaction, the merchant swipes the consumer's payment card 18 through a card reader 105 at the POS system 104. The POS system 104 sends data read from the card (e.g., the consumer/cardholder's name, credit card number, expiration date and card verification value (CVV)) to the computer system 114 of the merchant's acquirer (hereinafter "acquirer 114"). The acquirer 114 sends this data to the computer system 116 of the card payment network (e.g., Visa or MasterCard) (hereinafter "card payment network 116"), which forwards the data to the computer system 118 of the issuing bank (hereinafter "issuer 118"). If the transaction is approved by the issuer 118, a payment authorization message is sent from the issuer 118 to the merchant POS system 104, via a path generally opposite that described above.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

The rewards points technique introduced here can also be applied with cardless payment card transactions. Just as registered users have a relationship with the payment service 110 (e.g., by preregistering), some merchants also may have a relationship with the payment service 110 (e.g., by preregistering with the payment service 110), to enable the providing of additional services to consumers. Such merchants are referred to herein as "registered merchants." Registered merchants may use specially-configured POS systems (including software configured to communicate with the PSS 108) to enable registered consumers to use their payment cards to pay for purchases at a merchant's physical location, without the consumers having to have their cards in their physical possession at the time of the purchase, e.g., by using a "pay-by-name/pay-by-face" paradigm. Such transactions are called "cardless" payment card transactions herein. In general, in the case of a transaction with a registered merchant, the PSS 108 can function as an intermediary between the registered merchant and the registered merchant's acquirer 114. Note, however, that the details of how a "cardless" payment card transaction can be performed are not germane to the rewards points technique introduced here.

As noted above, the rewards points technique can be applied in a post-transaction manner to credit card transactions with non-registered merchants and to credit card transactions with registered merchants (e.g., cardless transactions). In either scenario, the PSS 108 may receive a transaction message indicative of a completed payment card transaction. In the context of this description, a transaction is deemed to be "complete" when the merchant's POS has received a message indicating that the transaction has been authorized by the appropriate third party (e.g., the card issuer), such that the consumer is deemed by the merchant to have fully paid. In the case of a non-registered merchant, the PSS 108 may receive the transaction message from the consumer's credit card issuer, as described above. If the transaction is with a registered merchant, the PSS 108 may instead receive the transaction message indicating the completed card transaction directly from the registered merchant (e.g., in a "cardless" credit card transaction). In other embodiments, the PSS 108 may receive the transaction message indicating the completed credit card transaction from some other entity.

The transaction message can include data descriptive of the transaction, such as the name of the cardholder, card number and expiration date, name and address of the merchant, total amount (payment amount) of the transaction, date and time of the transaction, and a list of items (goods and/or services) purchased in the transaction and their individual prices (i.e., a "shopping cart" list). The PSS 108 can use information in the transaction message to enable post-transaction application of rewards points to the transaction amount, as described further below. Note that the term "purchase" is used broadly herein to refer to any type of payment-based transaction and is not limited to a situation where an item changes ownership. Hence, a "purchase" in this description also can include a lease or rental, or a transaction involving services, or the like. Likewise, the term "sale" (as in "point-of-sale") also refers to any type of payment-oriented transaction.

The PSS 108, in response to a transaction message indicating a completed payment card based transaction involving a user 101, may send an interactive digital receipt for the transaction to the user's mobile device 102 (or another designated device associated with the user 101), where it is displayed or output to the user in some other manner. The interactive digital receipt in some embodiments provides a graphical user interface (GUI) and may include both program code and data. From the interactive digital receipt, the user can input a request, to the device 102, to apply rewards points associated with the user's credit card to the subject transaction. The request is sent by the user device 102 in a message to the PSS 108 via the internetwork 106 (which may include a wireless telecommunications network). The PSS 108 then causes the rewards points to be applied to the transaction.

Figure 2:
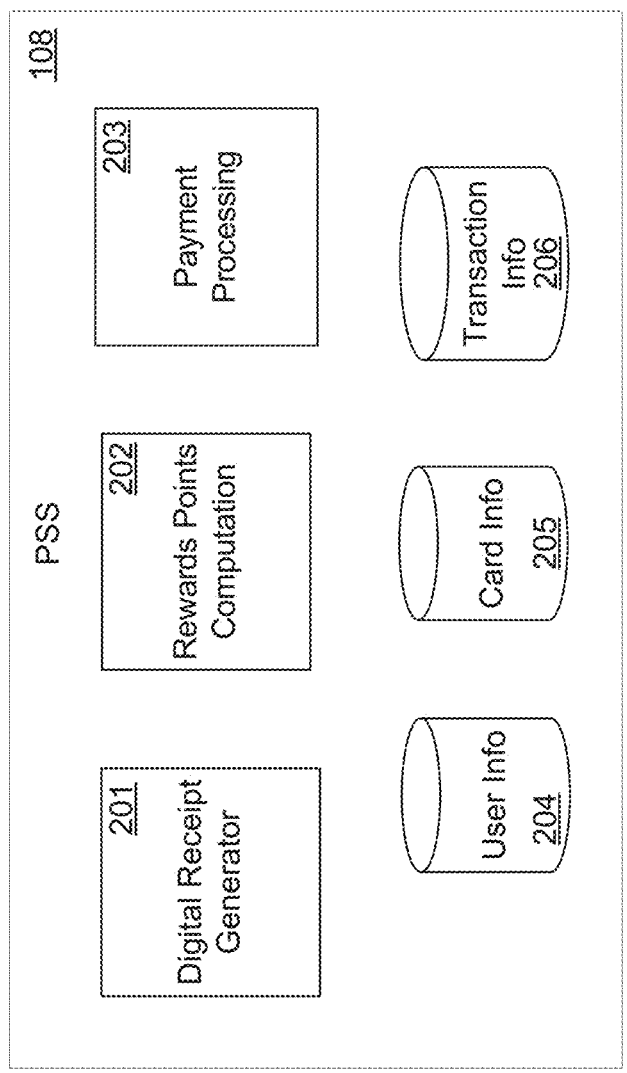
FIG. 2 illustrates an example of internal elements of the payment service system (PSS).

FIG. 2 illustrates internal elements of the PSS 108 according to some embodiments. As illustrated, the PSS 108 includes a digital receipt generator 201, a rewards points computation module 202 and a payment processing module 203. Additionally, the PSS 108 stores user information 204, payment card information 205 and transaction information 206. The user information 204 and card information 205 may be stored in the same database or in separate databases. The user information 204 and payment card information 205 are logically linked so as to associate each item of card information with the corresponding user information. The user information 204 includes information about registered users, such as their names, addresses and other contact information, and information about user devices of the users (e.g., mobile telephone numbers and/or mobile identification numbers (MINs)). The payment card information 205 may include, for example, credit card information of registered users, such as credit card number, expiration date, card verification value (CVVs) and security codes. Other types of card information may also be stored by the PSS 108, such as debit card information, bank account information, etc. The transaction information 206 may include, for example, data such as transaction amount, items involved in a transaction, and/or data received from other entities (e.g., the card network or issuer), any/all of which can be used by the PPS 108 to link together transaction refunds, voids and/or rewards points transactions.

The main function of the digital receipt generator 201 is to generate interactive digital receipts in response to card based transactions involving registered users. More particularly, the digital receipt generator 201 generates digital receipts in response to receiving transaction messages (e.g., from card issuers and/or registered merchant's POS systems) indicative of completed card based transactions (which may be card-present transactions or cardless transactions). The main functions of the rewards points computation module 202 are to determine (in response to a transaction message) the number of rewards points currently redeemable by a given user associated with a card used in a recent transaction, and to determine the number of rewards points corresponding to the amount of the transaction. In this regard, the rewards points computation module 202 may include logic to enable the PSS 108 to communicate with a card issuer's computer system directly or through a third party, to ascertain the number of rewards points currently available to a registered user, and to notify the issuer whenever rewards points are used for a transaction.

The main functions of the payment processing module 203 are to cause actual movement of funds and/or modification of transaction amounts in connection with applying rewards points. This may occur in any of several ways. For example, if a completed transaction has not yet been "captured" (i.e., the funds are being held by the issuer but have not yet been removed from the cardholder's account), then the payment processing module 203 may cause authorization of the transaction to be voided (e.g., by sending an electronic message to the issuing bank or by causing the merchant's POS system to do so), in which case the payment processing module 203 may request a new authorization for a lower amount if the rewards points are only being used for a portion of the total transaction amount. Alternatively, if the transaction has already been captured (i.e., the funds have been removed from the cardholder's account), then the payment processing module 203 may accomplish this by causing at least a portion of the transaction amount to be refunded or reversed. Note that as used herein, "causing" an action to occur means that the causing entity either performs the action itself or initiates a sequence of events that is ordinarily expected to lead to that action (which can be subject to satisfying certain intermediary conditions). Note that in some alternative embodiments, two or more of the digital receipt generator 201, the rewards points computation module 202 or the payment processing module 203 can be combined into a single functional module.

An example use scenario will now be described from a user's perspective, for at least one embodiment of the rewards points technique, with reference to FIGS. 3A through 3C. Assume that a registered user has just had a meal at an establishment called Joe's Restaurant and has paid for the meal with his credit card. Sometime after the credit card transaction is authorized (maybe only a few seconds I, or perhaps several hours later), the user receives an interactive digital receipt on his smartphone from the PSS 108. The digital receipt may be, though is not necessarily, generated and sent to the user's smartphone by the PSS 108 after a tip was added to the restaurant bill, as assumed in this example for the sake of simplicity.

Figure 3C:
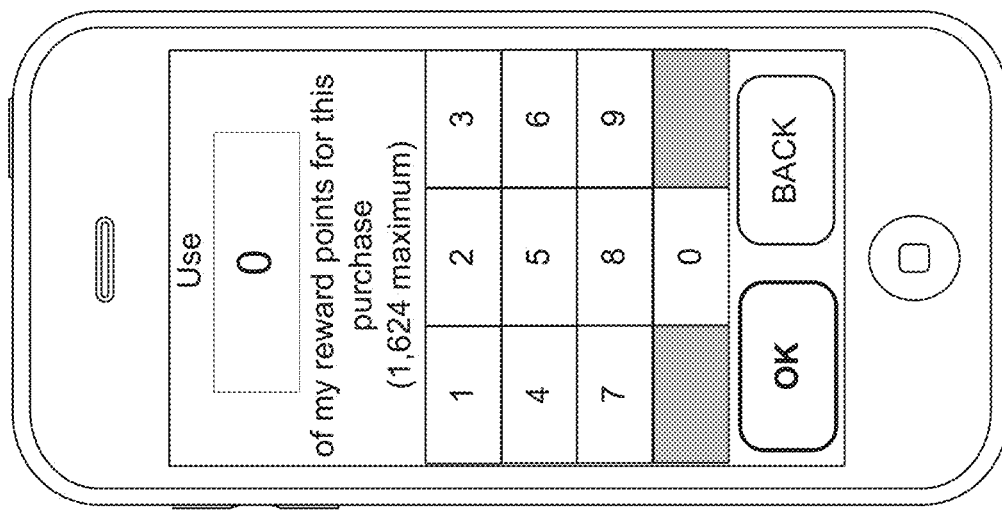
FIGS. 3A through 3C show illustrative display screens on a mobile device, associated with a digital interactive receipt including rewards points information.
Figure 3B:
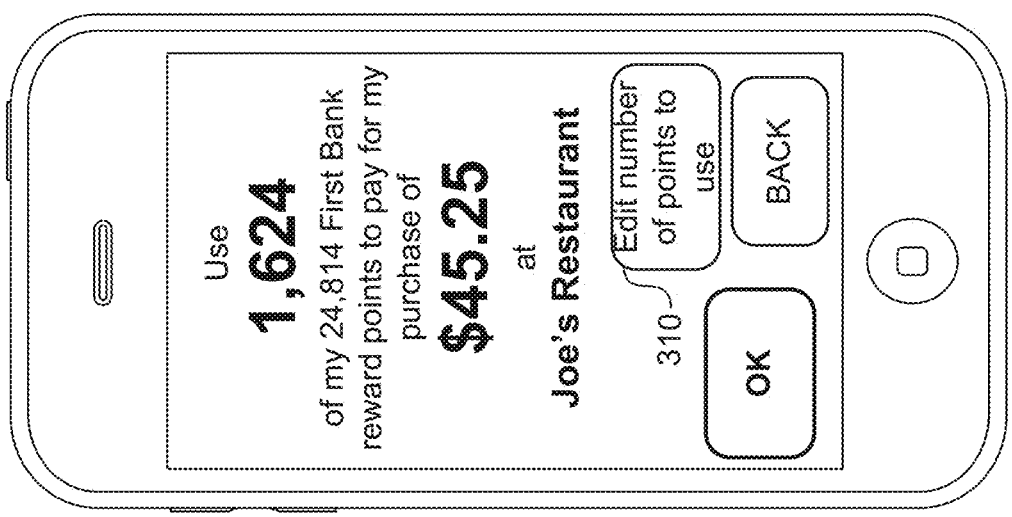
Figure 3A:
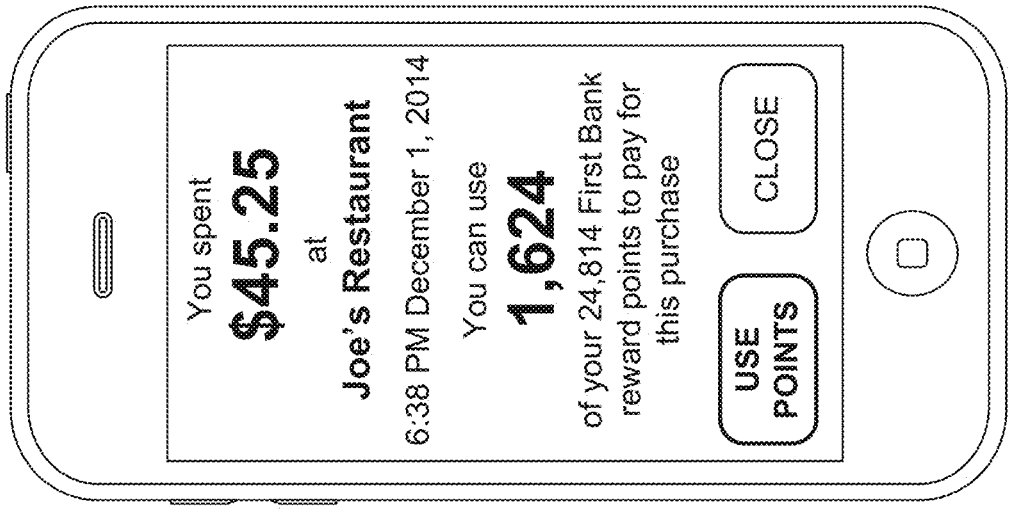

FIG. 3A shows an example of what the interactive digital receipt may look like when displayed on a touchscreen of the user's smartphone. The digital receipt includes the name of the merchant (Joe's Restaurant), the total transaction amount ($45.25), and the date and time of the transaction. Additionally, the digital receipt includes an indication of the number of rewards points (1,624) that corresponds to the transaction amount for the credit card that was used in the transaction (since there is not necessarily a one-to-one relationship between a rewards point and the applicable currency unit) and an indication of the total number of rewards points currently available (redeemable) for that credit card. The interactive digital receipt further includes a "Use Points" button or other similar control that, when activated by the user, takes the user to another screen, such as that illustrated in FIG. 3B.

In the screen of FIG. 3B, the user can simply press the "OK" button to apply the entire number of rewards points corresponding to the transaction amount; or, the user can press another button 301 to take the user to yet another screen, such as that shown in FIG. 3C, where the user can specify a different (presumably smaller) number of rewards points to apply. For example, in the present example the user may wish to apply only 1,000 rewards points to the transaction rather than the full 1,624 rewards points, thereby only paying for a portion of the transaction with rewards points.

Figure 4:
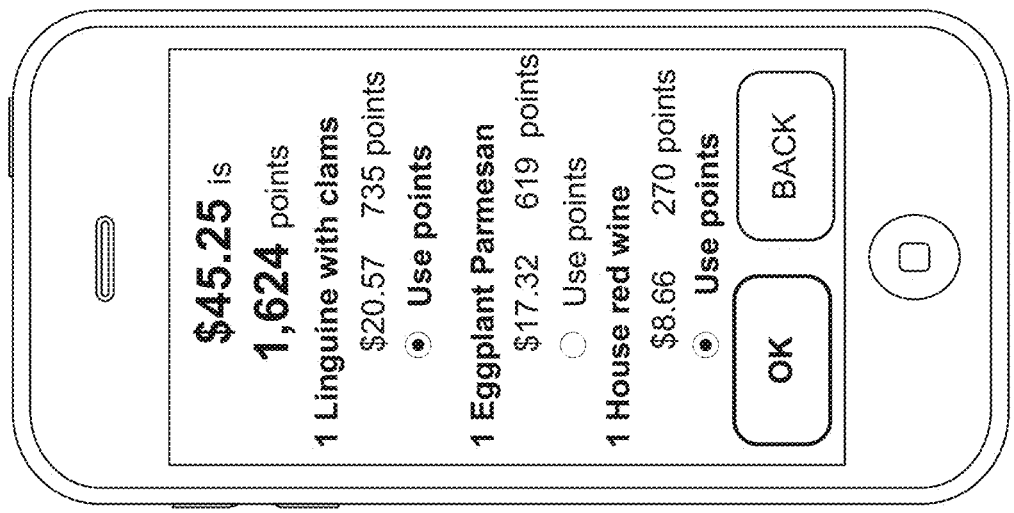
FIG. 4 shows an illustrative display screen on a mobile device, associated with an itemized digital interactive receipt including rewards points information.

The interactive digital receipt can include an itemized list of goods and/or services purchased in the transaction and their individual prices, i.e., a "shopping cart" list, as shown in the example of FIG. 4. The shopping cart information may have been obtained by the PSS 108 from the transaction message described above. In such an embodiment, the interactive digital receipt can allow the user to select one or more of the individual items, to whose portion(s) of the total amount he would like to apply corresponding amounts of rewards points. The PSS 108 can calculate the appropriate number of rewards points for each item based on each item's pro rata portion of the total transaction amount (factoring in tax if appropriate), or by any other suitable method. The number of rewards points corresponding to each item can be indicated next to each item on the interactive digital receipt, as shown in FIG. 4. The selection can be made using any conventional GUI control, such as by setting a radio button for each item on or off.

In some embodiments, the PSS 108 can track rewards points balances and related information for multiple categories or types of rewards points for a given card of a user, or for separate cards of a user. Consequently, in a similar manner to the itemization described above, the PSS 108 can present the user with the option to select one or more of multiple rewards points categories/types, whose points he or she wishes to apply to a given transaction. Hence, the user can apply points from two or more different categories/types (and potentially, from two or more different cards) to a given transaction.

Figure 5:
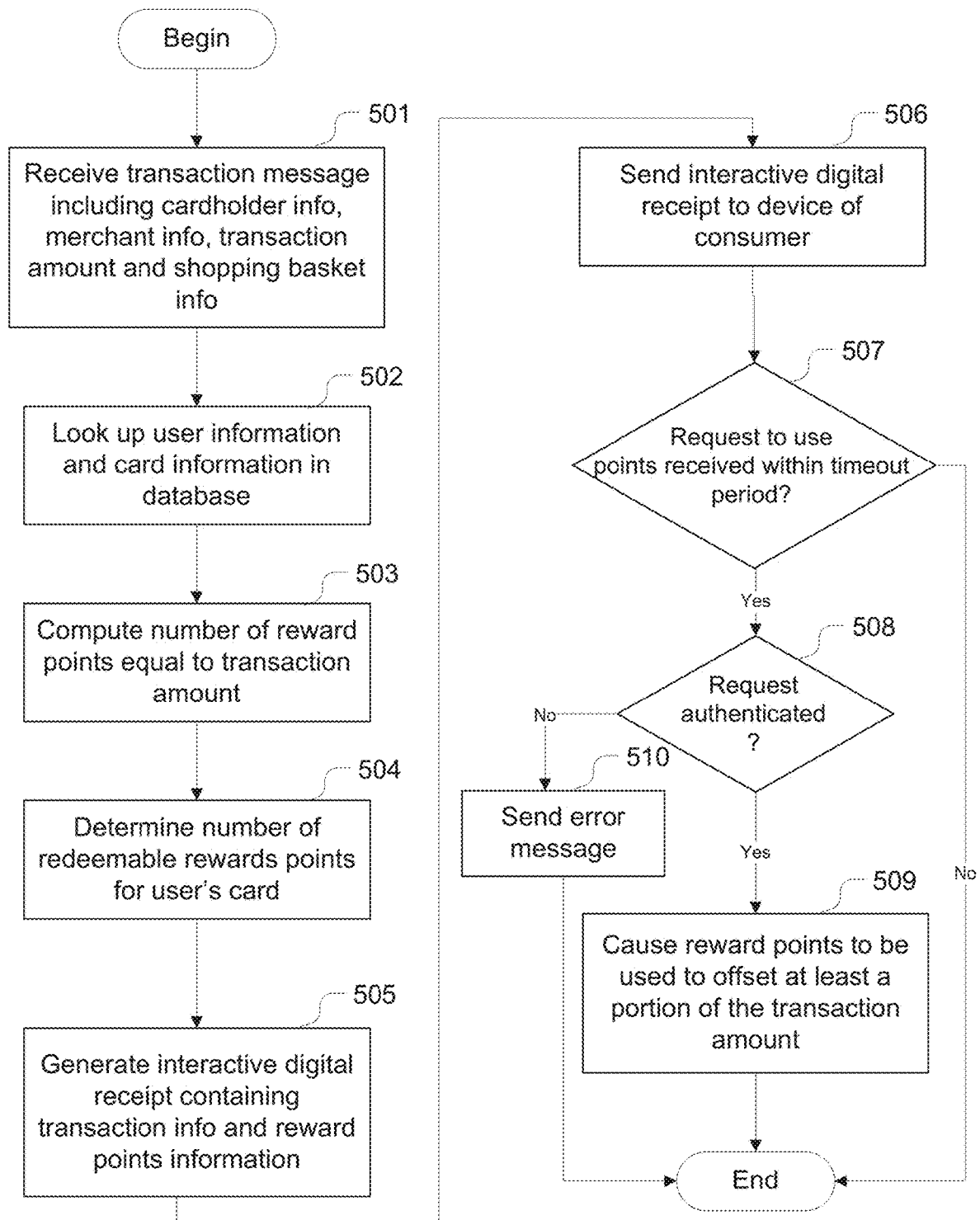
FIG. 5 is a flow diagram showing an example of a process for post-transaction application of rewards points.

FIG. 5 illustrates an example of a process that can be performed by the PSS 108 to implement the post-transaction rewards points technique described above. At step 501, the PSS 108 receives a transaction message relating to a completed card-based transaction of a registered user. The transaction message includes, for example, cardholder information about the user (e.g., cardholder name), merchant information (e.g., merge name and address), transaction amount and (optionally) shopping basket information. Next, at step 502 the PSS 108 looks up and reads, from its internal databases, user information and card information, corresponding to the information in the transaction message. The PSS 108 then at step 503 computes the number of rewards points equal to the transaction amount, based on a conversion factor published by the card issuer. At step 504 the PSS 108 communicates with the card issuer to determine the number of redeemable rewards points currently associated with the user's card that was involved in the transaction. This may be done by accessing a published API of the card issuer's computer system. Assuming the user has some redeemable rewards points, the PSS 108 at step 505 generates an interactive digital receipt containing transaction information and rewards points information, such as described above (or if the user has no redeemable rewards points, the process instead just ends at this point).

Next, at step 506 the PSS 108 sends to a user device of the consumer a message containing the interactive digital receipt, or for enabling the user device to access, retrieve and output the interactive digital receipt. In some cases the user device may be a mobile device of the consumer, whose telephone number was previously provided to the PSS 108 by the user and stored in a database of the PSS 108. In other cases the user device may be a conventional desktop computer or other device belonging to the user.

The interactive digital receipt can be sent to the user device in any of various formats and communication protocols, such as by email, short messaging service (SMS) message, multimedia messaging service (MMS) message, or the like. In some embodiments, the PSS 108 may simply send the user (e.g., via e-mail or SMS message) a hyperlink to a location where the interactive digital receipt is stored, which is downloaded to the user device only when the user activates the hyperlink. The user may have previously set a preference indicating which user device or devices should receive interactive digital receipts or related messages from the PSS 108.

After sending the interactive digital receipt (or a message for enabling access to it), if the PSS 108 then does not receive a request to use rewards points for the transaction from the user within a predetermined timeout period (step 507), the process simply ends without applying any rewards points to the transaction. Note that in some embodiments, the user may have the option to set a preference to apply any available rewards points to every transaction or to certain types of transactions, by default. If, however, the PSS 108 does receive a request to use rewards points within the timeout period, then the PSS 108 attempts to authenticate the request at step 508. Authentication may be done by, for example, requiring the user to input the payment card's CVV or some other personal information into the GUI when submitting the request, which is then compared by the PSS 108 to information in the PSS's databases. If the user's request is authenticated, the PSS 108 then causes the specified number of rewards points to be used to offset at least a portion of the transaction amount (depending upon how many rewards points the user indicated should be applied) at step 509. In some embodiments, step 509 is accomplished by the PPS 108 sending two or more messages to the issuer, either directly or through a third-party. For example, in some embodiments the PPS 108 sends to the issuer (either directly or through third-party) at least one request to deduct the appropriate number of rewards points from the user's account. Additionally, the PPS 108 sends to the issuer (either directly or through third-party) request to reconcile transaction amount. This could include reversal of the hold if the transaction has been authorized but not yet captured, or it could include reversal of the transaction and refunding of the money, if the transaction has already been captured. Additionally, this may be for the entire amount of the transaction or some partial amount, depending on how many rewards points were used, as indicated above.

If the request fails authentication, the PSS 108 instead just sends an error message to the user's device at step 510.

In some embodiments, the technique introduced here also enables a registered user to use credit card rewards points for a direct cash transfer from the person's bank account to the bank account of another person or entity. For example, in some embodiments the PSS 108 stores not only information about a person's credit card, including rewards points information, but also information about the person's bank account and an associated debit card. Such embodiments are now described further with reference to FIGS. 6A through 6C and FIG. 7.

In a cash transfer embodiment, instead of initially receiving a transaction message indicative of a completed transaction with the merchant, the initial message received by the PSS 108 may be an electronic message, from a registered user's device, representing a request to make a cash payment of a specified amount directly from the user's bank account to the bank account of another person or other entity. The user may have initiated such a request on his smartphone or other mobile device by using a mobile application (hereinafter the "cash app") on the mobile device, associated with the payment service 110. The cash app may take the user through a series of screens, examples of which are shown in FIGS. 6A through 6C.

Figure 6C:
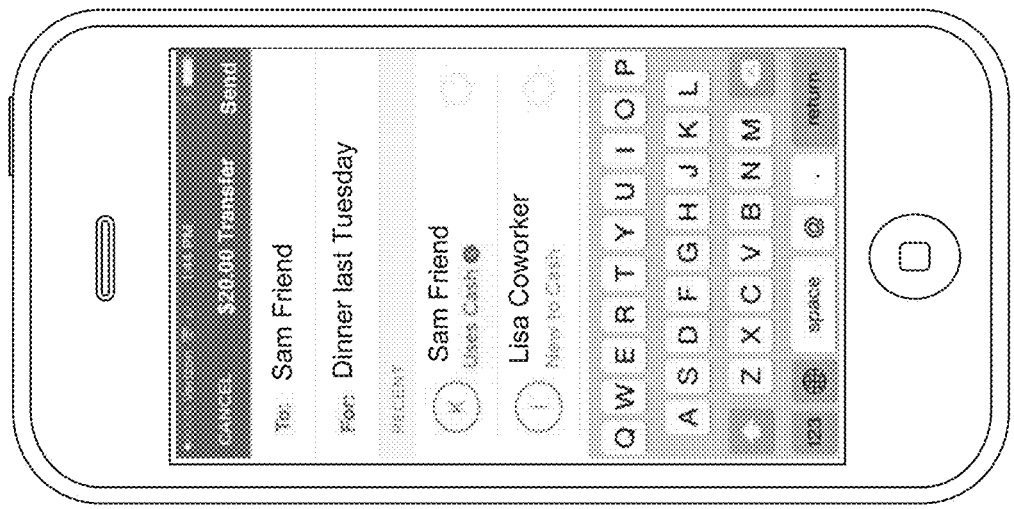
FIGS. 6A through 6C show examples of display screens on mobile device, associated with an electronic cash transfer.
Figure 6B:
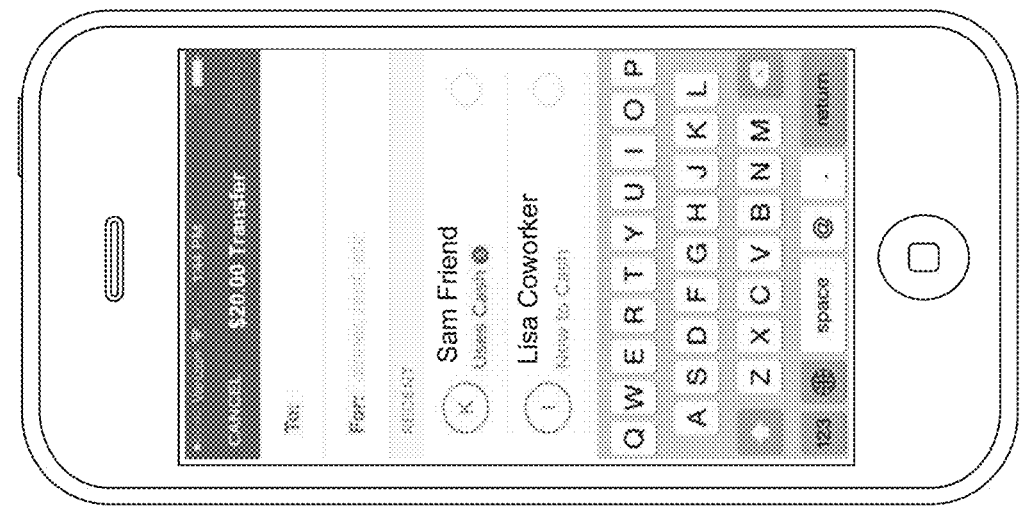
Figure 6A:
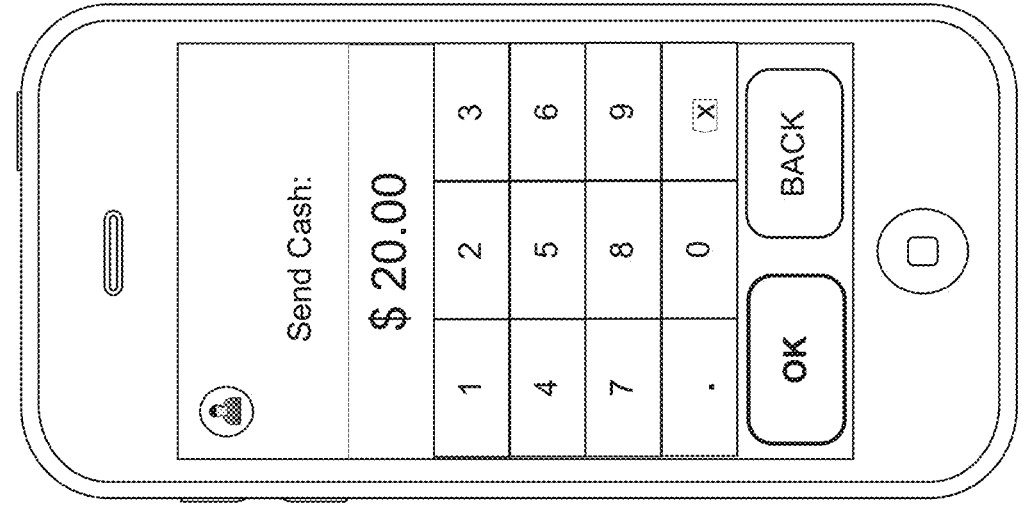

As shown in FIG. 6A, upon starting the cash app the user (the payer) enters the amount of cash to be sent. The user next specifies a person (or other entity) (the payee or recipient) to whom the cash is to be sent. As shown in FIG. 6B, the user may select the payee from a contact list, e.g., by name and/or email address. The payee can be, but is not necessarily, another registered user of the payment service who has previously provided his or her bank account information (e.g., including debit card information) to the PSS 108. If the payee is not a registered user, he will be invited by the PSS 108 to become a registered user in order to receive the cash transfer.

Additionally, the payer can input a brief memo indicating the purpose of the cash transfer, as shown in FIG. 6C, (e.g., in the "For" field), which will be included in the request and a subsequent message sent to the payee. Once all the information is entered, the payer can press "Send," which causes an email or other type of electronic message ("request message") to be sent by the user device to the PSS 108. The request message contains at least identification information of the payer, the requested payment amount, and identification information of the recipient/payee. The request message is analogous to the transaction message in the consumer/merchant embodiments described above, at least in terms of its effect. Upon receiving the request message, the PSS 108 sends a corresponding message to the payee, informing him or her of the pending cash transfer. If the payee is not a registered user of the payment service, the payee is invited to become one in order to receive the payment, including providing his or her debit card information to the PSS 108.

Figure 7:
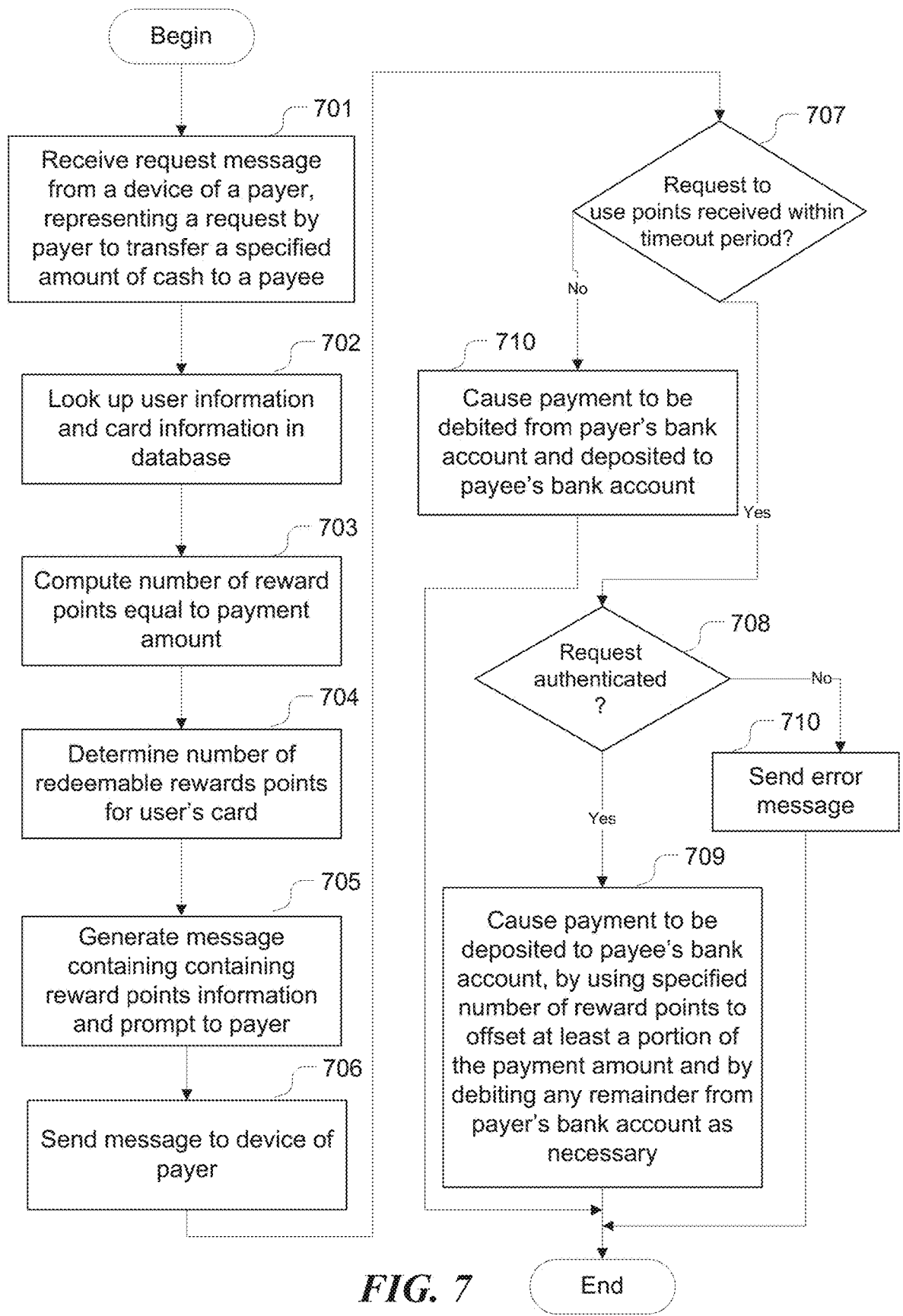
FIG. 7 is a flow diagram showing an example of a process for applying rewards points to an electronic cash transfer.

An example of the remainder of the process is described now in relation to FIG. 7. Initially, the PSS 108 receives the request message from the user device of the payer at step 701. At step 702 the PSS 108 looks up in its databases payer information and card information associated with the payer.

For purposes of enabling a cash transfer, it is assumed that the payer has previously provided to the PSS 108 detailed information about his or her bank account and an associated debit card. Hence, the PSS 108 can use the conventional debit card "rails" to effect such a transfer. Additionally, the user has previously provided the PSS 108 with information of a second payment card of the user that earns rewards points, which in this example is assumed to be (but is not necessarily) a credit card of the payer. Note that unlike in the consumer/merchant embodiments described above, however, the second payment card has not yet been used in relation to the requested cash transfer.

The PSS 108 then at step 703 computes the number of rewards points of the second card that equal the requested payment amount, using a known conversion factor. Next, at step 704 the PSS 108 communicates with the card issuer to determine the number of redeemable rewards points currently associated with the second payment card. Assuming the user has some redeemable rewards points, the PSS 108 next at step 705 generates a message containing rewards points information, and a prompt the user to indicate whether the awards points should be used for the cash transfer. In particular, in a manner similar to the digital receipt described above, this message can indicate the number of rewards points that corresponding to the requested cash transfer amount, as well as the total number of redeemable awards points available to the payer.

After sending the message, if the PSS 108 then does not receive a request to use rewards points for the payment from the user within a predetermined timeout period (step 707), the process simply continues by causing the cash transfer to be executed at step 710. This may be accomplished, for example, by debiting the payment amount from the payer's bank account and depositing the funds into the payee's bank account. In other embodiments, the user may have the option to set a preference to apply any available rewards points to every cash transfer, by default.

If the PSS 108 does receive a request from the payer to use rewards points for the payment within the timeout period, however, then the PSS 108 attempts to authenticate the payer's request at step 708. Authentication may be done, for example, in the same manner described above in the consumer/merchant examples. If the request fails authentication, the PSS 108 instead just sends an error message to the user's device at step 711. If the user's request is authenticated, the PSS 108 then at step 709 causes the specified number of rewards points to be used to offset at least a portion of the transaction amount (depending upon how many rewards points the user indicated should be applied). This action can include causing at least some of the cash transfer amount to be satisfied from the payer's credit card rewards points and deposited to the payee's bank account (e.g., by using the payee's debit card information), and causing any remainder of the specified transfer amount to be debited from the payer's bank account (e.g., by using the payer's debit card information) and deposited to the payee's bank account in similar manner.

In certain embodiments, the issuer of the payer's credit card maintains a pool of funds associated with its credit card rewards points program, and rewards points can be redeemed for funds from that pool. Hence, in step 709 above, satisfying some or all of a cash transfer amount from a payer's credit card rewards points can be accomplished in any of at least three ways: For example, the funds can be obtained by the PSS 108 directly from the issuer's rewards points pool of funds such as mentioned above. Alternatively, the funds can be debited from the cardholder's bank account by the PSS 108 and subsequently reimbursed from the issuer's rewards points pool of funds. As yet another alternative, the funds can be obtained by the PSS 108 as a cash advance from the cardholder's credit card account and then subsequently reimbursed from the issuer's rewards points pool of funds. It will be recognized that various other approaches are also possible.

Figure 8:
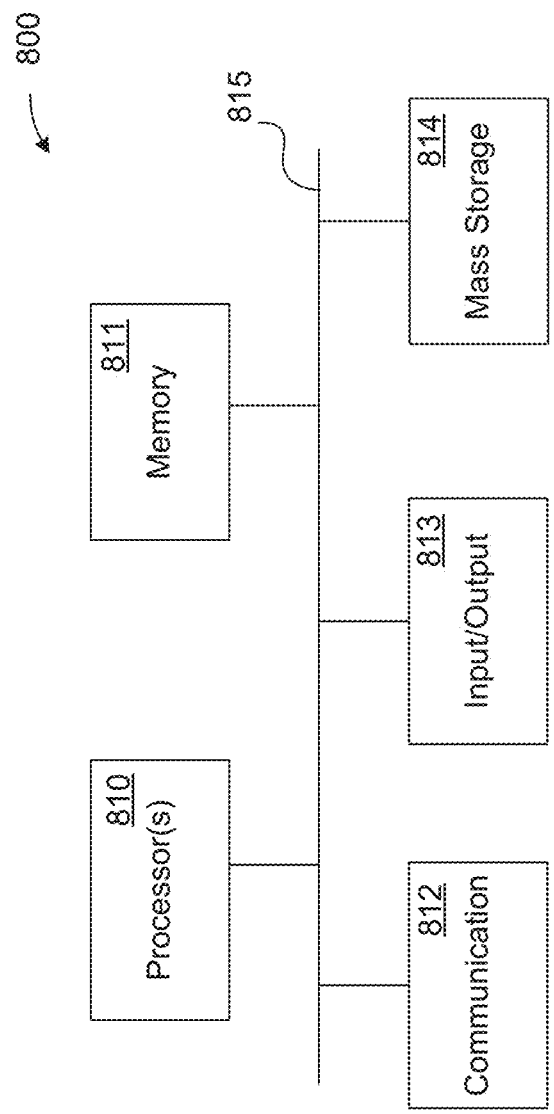
FIG. 8 illustrates a hardware architecture of a processing system that can be used to implement any of the devices mentioned herein, such as a user device, a point-of-sale (POS) system or the payment service system (PSS).

FIG. 8 illustrates at a high-level an example of a hardware architecture of a processing system that can be used to implement any of the devices referred to above, such as a user device of a registered user, a merchant's POS system, the PPS 108, etc. Any of these devices each can include multiple instances of an architecture such as shown in FIG. 8 (e.g., multiple computers), particularly server-based systems such as the PPS 108, and such multiple instances can be coupled to each other via one or more networks.

In the illustrated embodiment, the architecture 800 includes one or more processors 810, memory 811, one or more communication device(s) 812, one or more input/output (I/O) devices 813, and one or more mass storage devices 814, all coupled to each other through an interconnect 815. The interconnect 815 may be or include one or more conductive traces, buses, point-to-point connections, controllers, adapters and/or other conventional connection devices. The processor(s) 810 control the overall operation of the processing device 800 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Memory 811 can be or include one or more physical storage devices, which may be in the form of random access memory (RAM), read-only memory (ROM) (which may be erasable and programmable), flash memory, miniature hard disk drive, or other suitable type of storage device, or a combination of such devices. The mass storage device (s) 814 can be or include one or more hard drives, digital versatile disks (DVDs), flash memories, or the like. Memory 811 and/or mass storage 814 can store (individually or collectively) data and instructions that configure the processor(s) 810 to execute operations to implement the techniques described above. The communication devices 812 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc. Note, however, that such I/O devices may be unnecessary if the processing device 800 is embodied solely as a server computer.

In the case of a user device, the communication devices 812 can be or include, for example, a cellular telecommunications transceiver (e.g., 3G or 4G/LTE), Wi-Fi transceiver, baseband processor, Bluetooth or BLE transceiver, or the like, or a combination thereof. In the case of the PSS 108, the communication devices 812 can be or include, for example, any of the aforementioned types of communication devices, a wired Ethernet adapter, cable modem, DSL modem, or the like, or a combination of such devices.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of using payment card points for a funds transfer, the method comprising:

storing, in one or more records of a database of a server computer system operated by a payment service, credit card information associated with a credit card of a first person, the credit card information including points information indicative of points earned by the credit card of the first person;

receiving, at a first financial institution computer device, from a merchant point-of-sale system associated with a merchant, a first electronic message representing a request by the first person to electronically transfer a specified amount of funds from the first person to the merchant;

in response to receiving the first electronic message, communicating, by the server computer system, with the first financial institution computer device that maintains a first bank account of the first person, a second financial institution computer device that maintains a second bank account corresponding to the merchant point-of-sale system, and a remote computer system of an issuer of the credit card of the first person, to cause the specified amount of funds to be electronically transferred to the second bank account from the first bank account;

after completing transferring funds, receiving, at the server computer system from the first financial institution computer device, a second electronic message indicative of completion of the transfer of the specified amount of funds from the first person to the merchant;

in response to receiving the second electronic message, identifying, by the server computer system, a first number of the points earned by the credit card of the first person that correspond to the specified amount of funds;

transmitting, by the server computer system, an itemized interactive digital receipt to a mobile device of the first person, wherein the itemized interactive digital receipt comprises information about a transaction comprising a plurality of items, points information for the credit card, points values for each of the items, and a user interface allowing selection of one or more of the items;

receiving, by the server computer system from the mobile device, a request to use points for selected items, wherein the request indicates an interaction with the user interface selecting one or more of the items;

computing, by the server computer system, an amount of points corresponding to a sum of the respective points values of the selected items; and by the server computer system in response to receiving the request to use points, causing the amount of points to be used to satisfy at least a first portion of the specified amount of funds by communicating with the remote computer system of the issuer of the credit card of the first person to cause the amount of points to be deducted from a points balance of the credit card of the first person and to credit the first bank account by an amount corresponding to the amount of points.

2. The method of claim 1, further comprising:

causing funds corresponding to a second portion of the specified amount of funds to be transferred electronically from the first bank account of the first person to the second bank account of the merchant by use of first debit card information and second debit card information, without using points of the credit card to satisfy the second portion of the specified amount of funds.

3. A method comprising:

storing, in a computer system operated by a payment service, first payment card information associated with a first payment card of a person and second payment card information associated with a second payment card of the person, the first payment card being associated with a first financial account of the person, the second payment card being associated with a second financial account of the person, the first payment card information including points information indicative of points earned by the first payment card;

receiving, at the computer system, from a merchant point-of-sale system, a first electronic message representing a transaction to electronically transfer funds of a specified amount to a merchant financial account;

receiving, at an application on a personal device of the person, an itemized interactive digital receipt comprising information about a transaction comprising a plurality of items, the points information for the first payment card, points values for each of the items, and a user interface allowing selection of one or more of the items;

receiving, by the computer system, from the personal device of the person, a request to use points to fund at least a portion of the funds of the specified amount, wherein the request to use points indicates an interaction with the user interface choosing one or more selected items; and in response to the request, transmitting, by the computer system, at least an electronic message to at least one remote computer system to cause the funds of the specified amount to be electronically transferred to the merchant financial account, including causing an amount of points corresponding to a sum of the respective points values of the selected items to be used to satisfy at least a first portion of the funds of the specified amount.

4. The method of claim 3, wherein causing the amount of points associated with the first payment card to be used to satisfy at least the first portion of the funds of the specified amount comprises:

using the amount of points to be used for the first portion of the funds of the specified amount; and using funds from the second financial account to be transferred to the merchant financial account to satisfy a second portion of the funds of the specified amount.

5. The method of claim 3, wherein the second payment card is a debit card.

6. The method of claim 5, wherein the first payment card is a credit card.

7. The method of claim 6, wherein causing the amount of points associated with the first payment card to be used to satisfy at least the first portion of the funds of the specified amount comprises:

using the amount of points to be used for the first portion of the funds of the specified amount; and using funds from the second financial account to be transferred to the merchant financial account to satisfy a second portion of the funds of the specified amount.

8. The method of claim 3, wherein the first electronic message is at least one of an email message, an SMS message or an MMS message, representing the request by the person to electronically transfer the funds of the specified amount from the second financial account to the merchant financial account.

9. The method of claim 3, wherein the personal device of the person is a mobile communication device of the person.

10. A computer system operated by a payment service comprising:

one or more processors;

a database accessible to the one or more processors and storing first payment card information associated with a first payment card of a person and second payment card information associated with a second payment card of the person, the first payment card being associated with a first financial account of the person, the second payment card being associated with a second financial account of the person different from the first financial account, the first payment card information including points information indicative of points associated with the first payment card;

a network communication device coupled to the one or more processors, through which to receive, from a merchant point-of-sale system, a first electronic message representing a transaction to electronically transfer a specified amount of funds from the first financial account to the second financial account, transmit, to an application of a computing device of the person, an itemized interactive digital receipt comprising information about a transaction comprising a plurality of items, the points information for the first payment card, points values for each of the items, and a user interface allowing selection of one or more of the items, and receive, from the computing device of the person, a request to use points to fund at least a portion of the specified amount of funds, wherein the request to use points indicates an interaction with the user interface choosing one or more selected items; and a memory coupled to the one or more processors and storing program code that, when executed by the one or more processors, causes the computer system to execute a process that includes communicating with one or more remote computer systems via a computer network to cause an amount of points corresponding to a sum of the respective points values of the one or more selected items to be used to satisfy the specified amount of funds from the second financial account to a merchant financial account, including transmitting a second electronic message to cause the amount of points to be deducted from the first payment card and transmitting a third electronic message to cause the specified amount of funds to be transferred to the merchant financial account.

11. The computer system of claim 10, wherein said communicating comprises:
using the amount of points to be used for a first portion of the specified amount of funds; and
using funds from the second financial account to be transferred to the merchant financial account to satisfy a second portion of the specified amount of funds.

12. The computer system of claim 10, wherein the second payment card is a debit card.

13. The computer system of claim 12, wherein the first payment card is a credit card.

14. The computer system of claim 13, wherein said communicating comprises:
using the amount of points to be used for a first portion of the specified amount of funds; and
using funds from the second financial account to be transferred to the merchant financial account to satisfy a second portion of the specified amount of funds.

15. The computer system of claim 10, wherein the first electronic message is at least one of an email message, an SMS message or an MMS message, representing the request by the person to electronically transfer the specified amount of funds from the second financial account to the merchant financial account.

16. The computer system of claim 10, wherein the computing device of the person is a mobile device.

17. A non-transitory computer-readable storage medium storing code that, when executed by one or more processors in a computer system operated by a payment service, cause the computer system to execute operations comprising:
storing first payment card information associated with a first payment card of a person and second payment card information associated with a second payment card of the person, the first payment card being associated with a first financial account of the person, the second payment card being associated with a second financial account of the person, the first payment card information including points information indicative of points earned by the first payment card;

receiving from a merchant point-of-sale system, a first electronic message representing a transaction to electronically transfer a funds of a specified amount to a merchant financial account;

transmitting, to an application on a mobile communication device of the person, an itemized interactive digital receipt comprising information about a transaction comprising a plurality of items, the points information for the first payment card, points values for each of the items, and a user interface allowing selection of one or more of the items;

receiving, from the mobile communication device of the person, a request to use points to fund at least a portion of the funds of the specified amount wherein the request to use points indicates an interaction with the user interface choosing one or more selected items; and in response to the first electronic message,
transmitting at least a second electronic message to at least one remote computer system to cause the funds of the specified amount to be electronically transferred to the merchant financial account, including causing an amount of points corresponding to a sum of the respective points values of the one or more selected items to be used to satisfy at least a first portion of the funds of the specified amount.

18. The non-transitory computer-readable storage medium of claim 17, wherein causing the amount of points associated with the first payment card to be used to satisfy at least the first portion of the funds of the specified amount comprises:
using the amount of points to be used for the first portion of the funds of the specified amount; and
using funds from the second financial account to be transferred to the merchant financial account to satisfy a second portion of the funds of the specified amount.

19. The non-transitory computer-readable storage medium of claim 17, wherein the second payment card is a debit card.

20. The non-transitory computer-readable storage medium of claim 19, wherein the first payment card is a credit card.

21. The non-transitory computer-readable storage medium of claim 17, wherein causing the amount of points associated with the first payment card to be used to satisfy at least the first portion of the funds of the specified amount comprises:
using the amount of points to be used for the first portion of the specified amount; and
using funds from the second financial account to be transferred to the merchant financial account of the other entity to satisfy a second portion of the funds of the specified amount.

22. The non-transitory computer-readable storage medium of claim 17, wherein the first electronic message is at least one of an email message, an SMS message or an MMS message, representing the request by the person for the electronic transfer of the funds of the specified amount from the second financial account to the merchant financial account.

* * * * *